March 24, 1942.  O. S. MICHAEL  2,277,365

MEASURING APPARATUS

Filed June 17, 1939  2 Sheets-Sheet 1

INVENTOR
Oscar Stewart Michael
BY
Blair, Curtis, Dunne & Hayward
ATTORNEYS

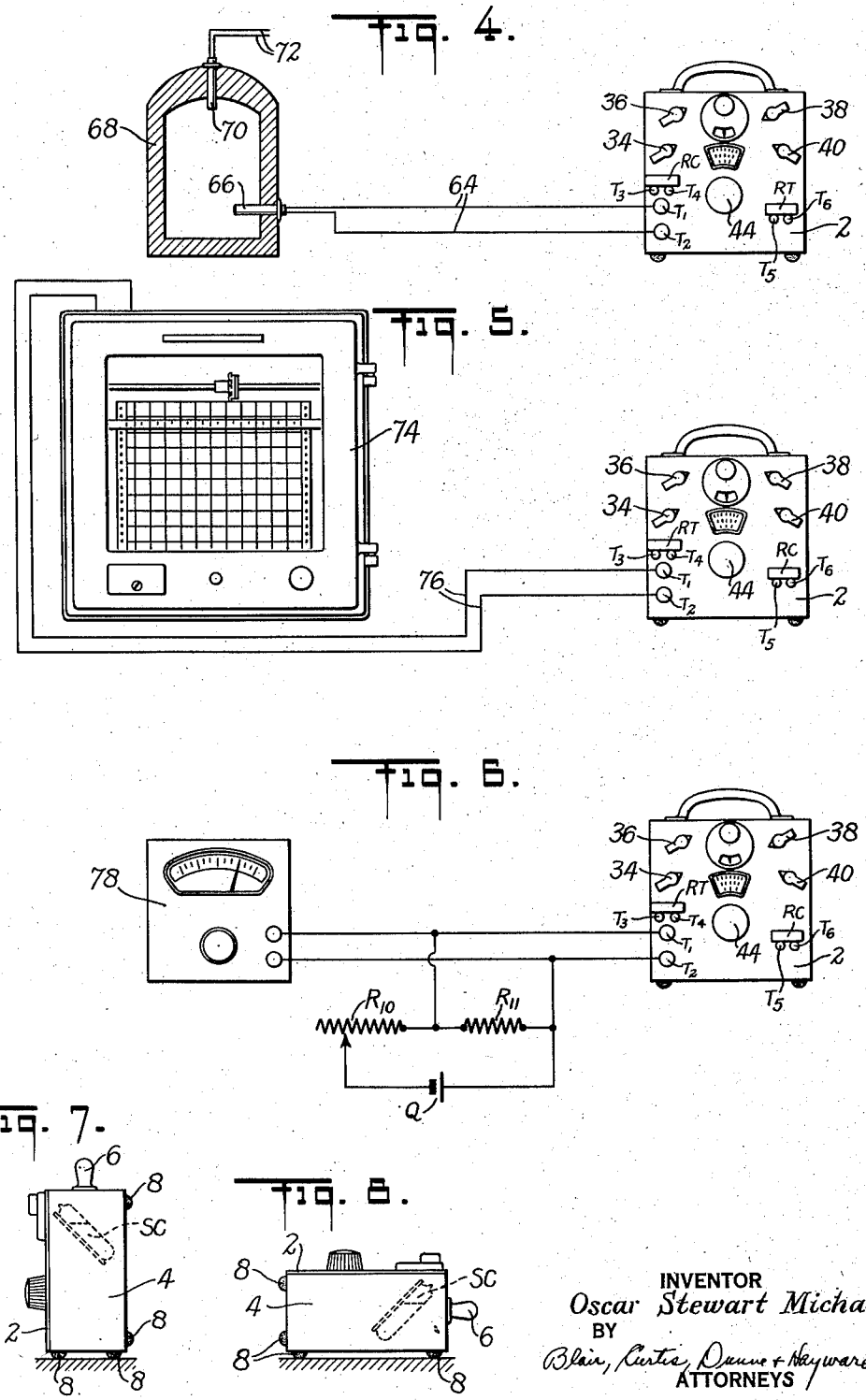

Patented Mar. 24, 1942

2,277,365

UNITED STATES PATENT OFFICE 2,277,365

MEASURING APPARATUS

Oscar Stewart Michael, Foxboro, Mass., assignor to The Foxboro Company, Foxboro, Mass., a corporation of Massachusetts Application June 17, 1939, Serial No. 279,637

12 Claims. (Cl. 171—95)

This invention relates to measuring apparatus, and more particularly to multi-range potentiometric measuring and testing instruments, and especially to portable instruments of this type.

Because of the extensive use in industry of thermocouples of many kinds for measuring the temperatures of processes, frequent measurements of many thermocouple temperatures are often necessary. Furthermore, due to the use of many highly sensitive control devices in connection with these thermocouples, frequent checks on the calibration of thermocouples, and of their related indicating, controlling, and/or recording instruments, are not only desirable but necessary for satisfactory operation of these devices. Such measurements and tests usually are made in the field, sometimes under adverse conditions. This necessitates a simple, rugged, versatile, and highly accurate potentiometric measuring instrument for making such measurements and tests.

It is an object of this invention to provide such a measuring and testing instrument capable of operating over many ranges of measurement with a minimum of adjustment but with a high degree of accuracy.

In checking and testing large installations using numerous thermocouples of different types, one of the disadvantages of testing instruments of the type used prior to this invention was that the instrument had to be restandardized each time the instrument was changed from one range of measurement to another. This need for constant restandardization slowed up the speed with which measurement could be made. Conversely, if the instrument was not restandardized each time the range was changed, the accuracy of the resulting measurements was considerably impaired. It is an object of this invention to provide a multi-range potentiometer instrument which operates with full accuracy on each range of measurement without the need for restandardizing each time the range is changed.

Potentiometric instruments require a standard potential cell for accurately calibrating the instrument. These cells are customarily of the liquid-filled type, and they are accurate only when the liquid is in its proper position in the lower portions of the cell. Prior to this invention these cells were mounted in the instrument case so that the instrument was operable in one position only. However, it is frequently desirable to operate such an instrument either in a horizontal or vertical position, depending upon the particular conditions encountered in the test. This is especially true when the instrument is used by operators who might carelessly use the instrument in the wrong position, thus producing inaccurate results. It is a further object of this invention, therefore, to provide a potentiometric test instrument in which the standard cell is so mounted that it will develop an accurate potential regardless of whether the instrument is placed in a horizontal or vertical position.

These and other apparent objects and advantages of this invention are obtained by the means described in the following specification, and may be more readily understood by reference to the accompanying drawings, in which.

Figure 1:
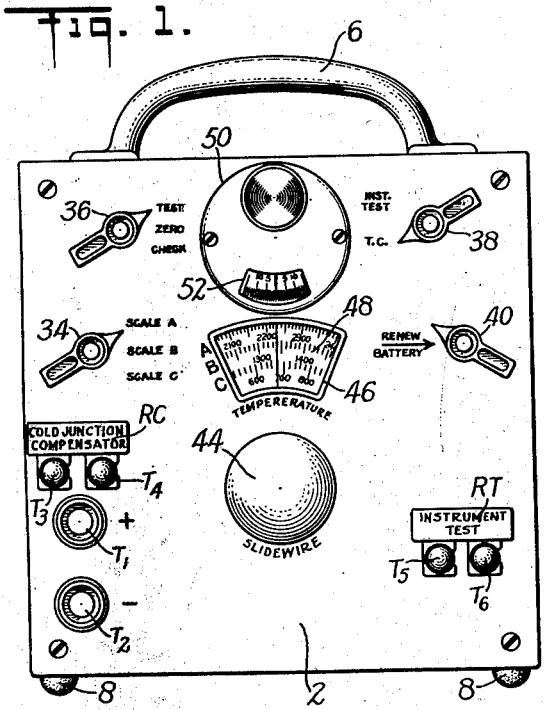
Figure 1 is a view of the panel of a multi-range test instrument embodying the invention.

Figures 4, 5, and 6 show the arrangements and connections for testing various devices with the instrument shown in Figure 1;

Figure 7 shows the arrangement of certain parts of the instrument when it is operated in a vertical position; and Figure 8 is a similar view when the instrument is operated in a horizontal position.

The instrument uses the potentiometric principle of measurement, in which the unknown E. M. F. is compared to a standard E. M. F. A sensitive galvanometer is used to determine when balance is reached between the unknown E. M. F. and the E. M. F. of a portion of a potentiometer circuit previously calibrated by comparison with a standard potential cell. In the present embodiment the instrument is designed to operate over three ranges of measurement, identified for purposes of the present description as ranges A, B, and C.

Figure 2:
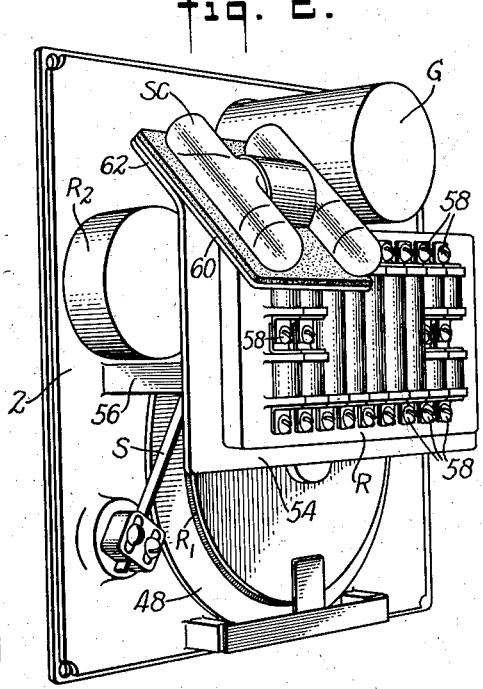
Figure 2 is a rear view in perspective of the panel shown in Figure 1 showing the arrangement of some of the parts of the instrument.
Figure 3:
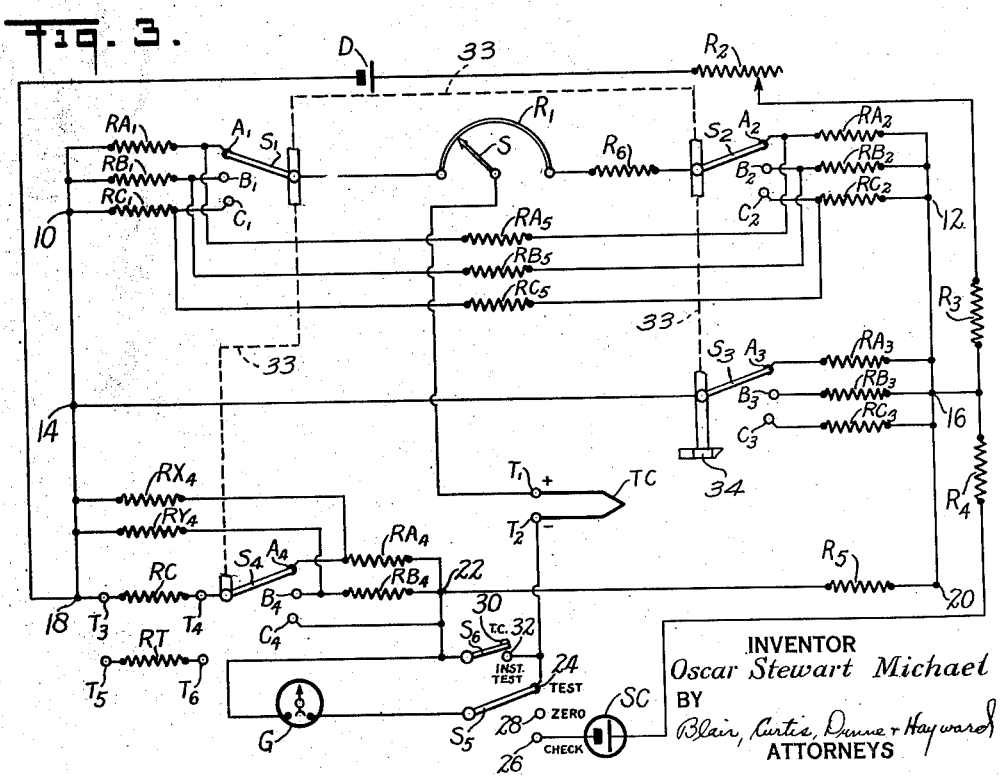
Figure 3 is a schematic wiring diagram of the instrument shown in Figure 1.

The layout, construction, and operation of the instrument shown in Figures 1 and 2 will perhaps be more readily understood by first referring to the schematic wiring diagram shown in Figure 3. A battery D supplies a direct current, which is adjusted to a desired constant value by means of an adjustable standardizing resistance $R_2$, through a current limiting resistor $R_3$ to a potentiometer circuit having three arms or branches connected between the terminals 10 and 12, 14 and 16, and 18 and 20, respectively. These three branches of the potentiometer circuit, for convenience in description, will be called "slidewire branch" between terminals 10 and 12, the "compensating branch" between terminals 14 and 16, and the "cold-junction compensation and standardizing branch" between terminals 18 and 20. Slidewire branch 10 to 12 includes a slidewire $R_1$ of fixed resistance through which a constant current from the battery D passes to produce a known potential drop. A sliding contact S, movable relative to the slidewire, provides means for comparing a portion of this known potential drop with an unknown potential by the well-known null-current method, and the position of this sliding contact S, as indicated, for example, by a dial setting, is an indication of the value of the unknown potential being measured. In the present invention this slidewire branch is also provided with means for changing this known potential drop across the slidewire to change the range of measurement of the instrument. Changing the range of the instrument also changes the resistance of the slidewire branch 10 to 12. The compensating branch 14 to 16 is provided to insert resistance into the potentiometer circuit to compensate for this change so that the overall resistance of the potentiometer circuit is always maintained constant. As this puts a constant resistance load across the battery D, the current flow therefrom is maintained the same for each range, thus obviating the need for adjusting the standardizing resistance $R_2$ each time the range is changed. The cold-junction-compensation portion of branch 18 to 20 is used, when measuring a thermocouple, to compensate for changes in the temperature of the cold-junction of the thermocouple so that the temperature measured by the instrument represents the true temperature of the thermocouple. The standardizing portion of branch 18 to 20, which comprises a standard resistance $R_5$, is provided for checking the calibration of the slidewire branch. The current through resistance $R_5$ is adjusted by means of standardizing resistance $R_2$ until the current flow from battery D is such that the drop across this standardizing resistance $R_5$ is equal to the voltage of a standard potential cell SC.

The slidewire branch 10 to 12 includes slidewire resistance $R_1$ and a slidewire calibrating resistor $R_6$, as well as range-changing resistors $RA_1$, $RB_1$, $RC_1$, $RA_2$, $RB_2$, $RC_2$, $RA_5$, $RB_5$, and $RC_5$, and their associated range-changing switches $S_1$ and $S_2$. The latter permit multirange measurement with a single slidewire which facilitates standardization of the equipment and quantity production, because a single-design slidewire $R_1$ of fixed resistance may be used, which can be set exactly to a standardized value by a factory adjustment of the auxiliary resistance $R_6$ connected to one end of the slidewire. The range of measurement of the instrument, and thus the type of thermocouples which may be tested or calibrated, is determined by the potential drop across the slidewire $R_1$. This potential drop is set by selecting suitable values for the resistors $RA_1$, $RA_5$, $RA_2$, etc., so that, for each particular range of measurement chosen by the setting of the range-selecting switches $S_1$ and $S_2$, a predetermined value of current flows through the slidewire $R_1$ and predetermined potential drops exist between the ends of slidewire $R_1$ and the terminals 10 and 12, respectively.

The compensating branch 14 to 16 of the potentiometer, comprising resistors $RA_3$, $RB_3$, and $RC_3$, and range-selecting switch $S_3$, is provided as aforementioned, to maintain the current drain on the battery D substantially constant by keeping constant the total resistance across the battery D due to the slidewire branch and the compensating branch, regardless of the variation in the resistance of the slidewire branch 10 to 12 caused by change in the range of measurement made by adjustment of the range-changing switches $S_1$ and $S_2$. The contact points $A_3$, $B_3$, and $C_3$ of the switch $S_3$ correspond respectively to measurement ranges A, B, and C, and to contact points $A_1$, $B_1$, $C_1$, and $A_2$, $B_2$, $C_2$, respectively, of range-changing switches $S_1$ and $S_2$. With this arrangement the proper resistance $RA_3$, $RB_3$, or $RC_3$ is switched in the potentiometric circuit in parallel with the slidewire branch 10 to 12 at any given range to compensate for any change in the resistance thereof caused by change in the range, thus maintaining a constant current drain from battery D.

The cold-junction and standardizing branch 18 to 20 of the potentiometer circuit includes a cold-junction compensation resistance RC, range-changing resistors $RX_4$, $RY_4$, $RA_4$, and $RB_4$, a range-changing switch $S_4$, and the standardizing resistor $R_5$. The drop across the latter resistor $R_5$ is compared with the potential of the standard cell SC when calibrating the potentiometer. The slidewire branch of the potentiometer 10, 12, and the cold-junction and standardizing branch 18 to 20 are connected in the usual manner by a circuit from a sliding contact S on the slidewire $R_1$ through terminals $T_1$ and $T_2$ of a thermocouple TC, through a "test" contact 24 of a switch $S_5$, and through galvanometer G to a point 22 intermediate the cold-junction-compensating resistance RC and the standardizing resistance $R_5$. To calibrate the instrument the standard cell SC is connected in series with a current limiting protective resistor $R_4$ and galvanometer G, across the standardizing resistance $R_5$ by moving switch $S_5$ to a "check" position on contact 26. Calibration is then accomplished by adjusting resistance $R_2$ until no current flows through galvanometer G.

A "zero" position of switch $S_5$ on contact 28 is provided to disconnect the galvanometer so that its zero setting may be adjusted when desired.

The cold-junction compensation switch $S_4$, having three contacts $A_4$, $B_4$ and $C_4$, corresponding to the three measurement ranges A, B, and C, connects suitable resistors $RX_4$ and $RY_4$ in parallel, and resistors $RA_4$ and $RB_4$ in series, respectively, with temperature compensating resistance RC for ranges A and B, respectively, so as to provide the proper amount of cold-junction-temperature compensation for these particular ranges without changing the overall resistance of the cold-junction and standardizing branch 18 to 20. Thus the current drain on battery D is not altered with the change in the cold-junction-temperature compensating effect necessitated by a change in the range of measurement of the instrument.

Inasmuch as the range-changing switches $S_1$ and $S_2$, and the range-changing compensation switches $S_3$ and $S_4$ must all be connected to corresponding contacts $A_1$, $A_2$, $A_3$, and $A_4$, etc., for any given range-setting of the instrument, they are preferably all connected to a common control shaft 33, shown schematically by the dotted line in Figure 3, so that they may be operated simultaneously by a single switch handle 34.

Switch $S_6$ is provided for short circuiting galvanometer G, by throwing it to an "instrument test" position on contact 32, when the instrument is to be used for testing or calibrating other potentiometer instruments instead of for measuring temperature with a thermocouple, as will be hereinafter described.

Referring now to Figures 1, 2, 7, and 8, the instrument comprises a suitable metal panel 2 which is secured to a rectangular metal housing 4 provided with a carrying handle 6 on one side thereof, and with rubber buttons 8 mounted on the four corners of the side of the housing opposite the handle 6, and to the four corners of the back of the housing opposite the panel 2, so that the instrument may be placed on one side or on its back without scratching the instrument housing or the surface on which it is placed. All of the instrument controls, scales, and terminals are mounted on the panel 2, as shown in Figure 1, and all of the circuit elements are suitably supported on the back of panel 2, as shown in Figure 2.

Referring to Figure 1, the shaft for operating the range-changing switches $S_1$, $S_2$, $S_3$, and $S_4$ is rotated by a range selector switch handle 34. The "test" or "check" switch $S_5$ is operated by switch handle 36, and the "thermocouple" or "instrument testing" selector switch $S_6$ is operated by switch handle 38. A control knob 40 operates the variable resistor $R_2$ in series with battery D, and when the resistance is decreased to the minimum, the handle 40 points to a marking "renew battery" on the panel 2 to indicate that the battery D needs replacing.

In the instrument described, the slidewire $R_1$ is moved relative to slidewire contact S instead of in the reverse manner as is frequently done. A control knob 44 on the panel 2 sets the position of the slidewire $R_1$ relative to sliding contact S (see Figure 2) and also moves a dial 48 past a window 46 in the panel to indicate the position of the slidewire relative to the contact, thus showing the E. M. F. setting of the potentiometer, or the temperature setting, if the potentiometer is so calibrated. The galvanometer G is mounted at the top of the panel, as shown at 50, and provided with a window 52 through which the galvanometer reading may be observed.

The cold-junction-temperature compensating resistance RC is mounted on terminals $T_3$ and $T_4$ on panel 2 in close proximity to thermocouple terminals $T_1$ and $T_2$, as shown in Figure 1, so that it is subject to the same temperature as the cold-junction of a thermocouple connected to terminals $T_1$ and $T_2$. When the instrument is to be used for instrument testing the compensating resistance RC is disconnected from terminals $T_3$ and $T_4$ and a second resistor RT, of substantially the same resistance value but made of a material such as manganin, having an approximately zero resistance coefficient, is connected to these terminals $T_3$ and $T_4$. This eliminates the cold-junction-temperature compensation effect when the instrument is not being used to test thermocouples. When not in use, this auxiliary resistor RT may be mounted on a pair of dummy terminals $T_5$ and $T_6$ on the panel 2.

The remainder of the resistances in the circuit, i. e., the fixed resistances $RA_1$, $RB_1$, $RC_1$, $RA_2$, etc., are mounted on a resistance mounting R attached to a plate 54 secured to the panel 2 by posts 56. This resistance mounting R is so designed that the various fixed resistors in the circuit may be changed by merely unscrewing fastening screws 58 at either end of the individual resistors. This provides an easy method for changing the fixed resistors in the circuit and thus changing the various measurement ranges of the instrument.

The standard cell SC is suitably secured to a mounting plate 60 which in turn is attached to a projection 62 of plate 54 bent at an angle of 45° to the plate 54, as shown in Figure 2. Thus, the standard cell SC is mounted in the instrument at an angle of 45° to the plane of the panel 2. With this construction the standard cell SC is always in an operative position, as may be more readily seen from Figures 7 and 8, whether the instrument is placed on its back or on its base, which positions are the two most convenient operating positions of the instrument, as is obvious from the location of the handle 6. Furthermore, this construction has the advantage that the cell is also always in operative position if the instrument is used in some angular position intermediate these usual horizontal or vertical operating positions.

As pointed out above, a checking and testing instrument embodying this invention has numerous uses. For example, it may be used to check and calibrate thermocouples which are permanently installed in furnace walls or other inaccessible locations. Referring to Figure 4, the leads 64 of the thermocouple 66 mounted in an oven 68 are connected in proper polarity to terminals $T_1$ and $T_2$ of the test instrument. Assuming that the instrument has been calibrated, switch handle 34 of range-control switches $S_1$, $S_2$, $S_3$, and $S_4$ is set in a position corresponding to the temperature range of the thermocouple 66, and handles 36 and 38 of switches $S_5$ and $S_6$, respectively, are set in their "test" and "thermocouple" positions, respectively, i. e., on contacts 24 and 30. Control knob 44 of the potentiometer slidewire $R_1$ is then rotated until the galvanometer G indicates a null current position when the temperature being measured by thermocouple 66 is indicated through the window 46 on the scale corresponding to the setting of range-selector switch handle 34. If one or more additional thermocouples 70 should chance to be mounted on or about the oven 68, the leads 72 from one of these thermocouples can be attached to terminals $T_1$ and $T_2$ in place of leads 64 of thermocouple 66, and the temperature measured by this second thermocouple 70 can be measured immediately by rotating knob 44 until a balance is reached, as indicated by null reading of the galvanometer G. If, however, this second thermocouple 70 requires the instrument to be set at a different measurement range, this may be done by merely shifting range-selector switch handle 34 to the proper range, and it is not necessary to recalibrate the instrument after this range change by operating switch handle 36 of switch $S_5$ and control knob 40 of resistance $R_2$ before this temperature measurement is made.

The instrument may also be used to check the calibration of other potentiometric instruments by using it as a standard potential source. For example, referring to Figure 5, a self-balancing potentiometer recorder, generally shown at 74, may be checked by connecting its thermocouple terminals to the terminals $T_1$ and $T_2$ of the test instrument. The zero coefficient resistance RT is connected across terminals $T_3$ and $T_4$ in place of the cold-junction compensation resistance RC, and test switch control handle 38 is placed in its "instrument test" position, thus shorting galvanometer G. When the circuit is in this condition with the variables of cold-junction compensation resistance RC and galvanometer resistance out of the circuit, the instrument acts as a highly accurate source of standard potential. Thus the potentiometer recorder 74 can be accurately calibrated across its entire scale by merely setting knob 44 to the particular temperatures to be checked. If such calibration should require a change in the range of the test instrument in order completely to calibrate recorder 74, this range change can be made at any time during the calibration run without the need for restandardizing the instrument after the range change is made.

The test instrument may also be used to calibrate millivoltmeters by using the arrangement shown in Figure 6. Inasmuch as the test instrument cannot be used as a source of current but merely as a standard potential source, an external source of electric power must be provided, such as the battery Q. This battery Q is connected in series with a fixed resistance $R_{11}$ and a variable resistance $R_{10}$ so that the voltage drop across the fixed resistance $R_{11}$ may be varied. A millivoltmeter 78 is connected across the fixed resistance $R_{11}$ to measure the voltage drop thereacross. Terminals $T_1$ and $T_2$ of the test instrument are also connected across fixed resistance $R_{11}$. The range-selector switch handle 34 is set to the appropriate scale corresponding to the range of the millivoltmeter 78, the test control switch handle 38 is set in its "thermocouple" position so as to connect the galvanometer G in the circuit, and the zero coefficient resistance RT is connected across terminals $T_3$ and $T_4$ in place of the cold-junction compensating resistance RC. With this arrangement, whenever a balanced condition is indicated by the galvanometer G upon adjustment of the control knob 44, the scale 48 of the test instrument will accurately indicate the voltage developed across resistance $R_{11}$ and therefore the voltage which should be indicated by the millivoltmeter 78.

This instrument may also be used for taking readings in large industrial plants having many widely scattered thermocouples of different types which must be read at definite intervals. The leads from these thermocouples are brought to a central point and connected successively to the terminals $T_1$ and $T_2$ (preferably by means of permanently connected key switches). The temperatures of these thermocouples may be measured with this instrument almost as rapidly as they can be written down because there is no need to restandardize the instrument between readings, even if various types of thermocouples with different ranges are being successively measured.

Numerous similar calibrations, measurements, and tests can be made with an instrument embodying the invention herein described, and these measurements can be made rapidly and accurately because of the advantageous features of the instrument.

As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In a multi-range potentiometric measuring instrument having means for comparing the potential across a portion of a slidewire with the potential to be measured, in combination, a source of direct current, control means for regulating the current flow from said source, a slidewire resistance, a plurality of range-changing resistances, means for selectively connecting certain of said resistances and said slidewire across said source and said control means to produce a predetermined potential across said slidewire for each range of measurement, a group of resistances, means for selectively connecting a certain amount of resistance from said group across said source and said control means to maintain the effective resistance thereacross the same for each range of measurement so that the current flow from said source remains constant for all ranges of measurement at the value determined by said control means.

2. In a multi-range potential measuring apparatus of the potentiometric type, in combination, a source of direct current, means for regulating the flow of current from said source, a first group of resistances, a slidewire resistor, first switching means for selectively connecting said slidewire resistor and certain resistances of said first group in a first circuit across said source to change the range of measurement of said instrument, a second group of resistances connected in a second circuit in parallel with said first circuit and across said source, second switching means in said second circuit operable simultaneously with said first switching means for selectively connecting a certain amount of resistance from said second group across said source for each range of measurement determined by said first switching means, said resistances of said second group being of such value relative to the corresponding resistances in said first group that the total resistance connected across said source and said control means remains the same for each range of measurement and thus the current flow from said source remains constant at the value determined by said regulating means regardless of the measurement range to which said first switching means is set.

3. In a multi-range potentiometric measuring apparatus for measuring the E. M. F. of a thermocouple, in combination, a thermocouple having a cold-junction, a first group of resistances, first switching means for selectively connecting certain of said resistances in a circuit with said thermocouple to provide various ranges of measurement for said apparatus, and a cold-junction-temperature compensating circuit including, a temperature responsive resistance, a second group of resistances, and second switching means for selectively connecting certain resistances of said group with said temperature responsive resistance to adjust the compensating effect thereof for each range of measurement but to maintain the effective resistance of said cold-junction-temperature compensating circuit substantially constant for all ranges.

4. In a multi-range potentiometric measuring apparatus for measuring the E. M. F. of a thermocouple, in combination, a thermocouple having a cold-junction, a source of direct current, a slidewire resistance, a first group of resistances, first switching means for selectively connecting said slidewire resistance and certain of said resistances in a circuit across said source to change the range of measurement of said apparatus but to maintain the overall resistance of said circuit constant for all ranges, a cold-junction-temperature compensating circuit including a temperature responsive resistance, a second group of resistances, and second switching means for selectively connecting certain resistances of said second group with said temperature responsive resistance to adjust the compensating effect thereof for each range but to maintain the effective resistance of said cold-junction-temperature compensating circuit substantially at a fixed value for all ranges.

5. In a multi-range potentiometric instrument for measuring the E. M. F. of a thermocouple, in combination, a thermocouple having a cold-junction, a source of direct current, a slidewire resistance, a first group of resistances, first switching means for selectively connecting said slidewire resistance and certain of said resistances in a first circuit across said source to produce a predetermined potential across said slidewire for each range of measurement, a second group of resistances, second switching means for selectively connecting a certain amount of resistance from said second group in a second circuit across said source to maintain the combined resistance of said circuits connected across said source constant for all ranges, a cold-junction-temperature compensating circuit connected across said source including a temperature responsive resistance, a third group of resistances, third switching means for selectively connecting certain resistances of said third group with said temperature responsive resistance to adjust the compensating effect thereof for each range but to maintain the effective resistance of said cold-junction compensating circuit substantially at a fixed value for all ranges, and means for simultaneously and correspondingly operating said first, second, and third switching means to change the range of measurement of said apparatus without changing the total resistance connected across said source, whereby the current flow from said source remains constant for all ranges of measurement.

6. In a multi-range potentiometric measuring apparatus for measuring the E. M. F. of a thermocouple, in combination, a thermocouple, a source of direct current, means for regulating the flow of current from said source, a first circuit including a slidewire resistance and a first group of resistances connected across said source and said regulating means, first switching means for selectively connecting certain of said resistances to said slidewire to produce a predetermined potential across said slidewire for each range of measurement, a second circuit including a second group of resistances and second switching means for selectively connecting a certain amount of resistance from said second group across said source and said regulating means for each range of measurement determined by said first switching means, the value of the resistance connected by said second switching means for each range of measurement being such that the total resistance across said source and said regulating means is the same for all ranges, a cold-junction-temperature compensating circuit including a fixed resistance and a temperature responsive resistance effectively connected across said source and said regulating means in parallel with said first and second circuits, a sliding contact associated with said slidewire resistance, a balancing circuit connected from said sliding contact to said cold-junction-temperature compensating circuit at the common connection between said temperature responsive resistance and said fixed resistance and including said thermocouple and a null current indicator, a third group of resistances connected in said cold-junction-temperature compensating circuit, third switching means for selectively connecting certain resistances of said third group in series and in parallel with said temperature responsive resistance so that the compensating effect of said compensating resistance is adjusted for each range of measurement but the resistance of said cold-junction-temperature compensating circuit is substantially the same for all ranges, and means for simultaneously and correspondingly operating said first, second, and third switching means to change the range of measurement of said apparatus without changing the total resistance connected across said source and said regulating means whereby the current flow from said source remains constant at the value determined by said regulating means.

7. In a potentiometric measuring instrument, in combination, a liquid-filled type standard potential cell operative only when the liquid in said cell is in the lower portions thereof, and means for mounting said cell in said instrument so that said cell is maintained in operative positions when said instrument is rotated through vertical angles not exceeding approximately ninety degrees.

8. In a potentiometric measuring instrument, in combination, a liquid-filled type standard potential cell, and means for mounting said standard potential cell in said instrument in a plane at an angle of approximately forty-five degrees to the plane of one face of said instrument whereby said cell is maintained in operative positions for any orientation of said face of said instrument from a horizontal to a vertical plane.

9. In a portable potentiometric measuring instrument having a control panel on one face thereof, in combination, a liquid-filled type standard potential cell for checking the calibration of said measuring instrument, and a bracket secured to said panel for mounting said standard potential cell in said instrument in a plane at an angle of approximately forty-five degrees to the plane of the control panel of said instrument, the planes of said cell and control panel converging toward the tops of the cell and panel whereby said cell is in operative positions for any rotation of said instrument which moves the plane of said control panel through a vertical angle not exceeding approximately ninety degrees.

10. In a potentiometric apparatus having a potentiometer circuit and a circuit including a standard potential cell for checking the calibration of said potentiometer circuit, in combination, a casing for housing said apparatus, one side of said casing serving as a panel for mounting the controlling and indicating means of said apparatus, a standard potential cell of the liquid-filled type, and means for mounting said cell in said casing in a plane making an angle of approximately forty-five degrees with the plane of said panel and intersecting the plane of said panel in a line parallel to the top thereof, the top of said cell being closer to the top of said panel than the bottom of said cell whereby said cell is in operative positions whether the apparatus is in use with said panel in a horizontal or a vertical position.

11. In a multi-range potentiometric measuring instrument having means for comparing the potential across a portion of a slidewire with a potential to be measured, in combination, a source of direct current, control means for regulating the current flow from said source, a slidewire resistance, a plurality of range-changing resistances, means for selectively connecting certain of said resistances and said slidewire in a potentiometer circuit across said source and said control means, a standard potential cell, means for connecting said standard potential cell to said potentiometer circuit for determining the adjustment of said control means necessary to produce a predetermined potential across said slidewire for each range of measurement, a group of resistances, means for selectively connecting a certain amount of resistance from said group across said source and said control means to maintain the effective resistance thereacross the same for each range of measurement so that the current flow from said source remains constant for all ranges of measurement at the value determined by said control means to make it unnecessary to adjust said control means to produce said predetermined slidewire potentials each time the range of measurement is changed.

12. In a multi-range potentiometric measuring apparatus for measuring the E. M. F. developed by thermocouple means, in combination, a thermocouple having a cold-junction, a source of direct current, a multi-range potentiometer circuit connected across said source of direct current, a null current circuit including a null current indicator connected to said potentiometer circuit, and a multi-range cold-junction-temperature compensation circuit comprising a cold-junction-temperature compensating resistance mounted in close proximity to said cold-junction, a fixed resistance, said compensating resistance being connected in series with said fixed resistance across said source of direct current, said null current circuit being connected between said fixed and compensating resistances, a plurality of resistances, switching means for selectively connecting one of said resistances in parallel with said compensating resistance and another in series with said compensating resistance for each desired range of measurement other than the range over which the compensating resistance is designed to operate alone, whereby the cold-junction-compensation effected by said compensating resistance is varied for each range while the overall resistance of said compensation circuit is maintained substantially constant for all ranges.

OSCAR STEWART MICHAEL.

DISCLAIMER 2,277,365.—*Oscar Stewart Michael*, Foxboro, Mass. MEASURING APPARATUS. Patent dated Mar. 24, 1942. Disclaimer filed Nov. 29, 1945, by the assignee, *The Foxboro Company*.

Hereby enters this disclaimer to claims 7, 8, 9, and 10 of said patent.

[*Official Gazette December 25, 1945*]